United States Patent
Boos

[11] Patent Number: 6,105,533
[45] Date of Patent: Aug. 22, 2000

[54] DRUM FOR HOLDING A PARTICULATE MATERIAL, DEVICE HAVING A DRUM AND PROCESS FOR THE PRODUCTION OF THE DRUM

[75] Inventor: Günther Boos, Bad Säckingen, Germany

[73] Assignee: Glatt Maschinen- und Apparatebau AG, Pratteln, Switzerland

[21] Appl. No.: 09/114,919

[22] Filed: Jul. 14, 1998

[30] Foreign Application Priority Data

Jul. 17, 1997 [CH] Switzerland .............................. 1755/97

[51] Int. Cl.⁷ .............................. A23G 3/20; B05C 3/08
[52] U.S. Cl. .............................. 118/19; 118/20; 118/418; 34/595; 34/602; 34/603; 366/234
[58] Field of Search .............................. 134/120; 68/142; 34/595, 602, 603, 136, 137; 366/234; 118/19, 20, 418; 427/2.14, 212, 213, 242, 425

[56] References Cited

U.S. PATENT DOCUMENTS

| | | | |
|---|---|---|---|
| 3,668,997 | 6/1972 | Ratowsky | .................................. 68/142 |
| 3,952,757 | 4/1976 | Huey | ........................................ 134/134 |
| 4,543,906 | 10/1985 | Glatt et al. | ................................. 118/19 |

FOREIGN PATENT DOCUMENTS

| | | |
|---|---|---|
| 2065417 | 6/1971 | France . |
| 59-091865 | 5/1984 | Japan . |
| 1257065 | 9/1986 | U.S.S.R. . |
| 1561029 | 2/1980 | United Kingdom . |

*Primary Examiner*—Laura Edwards
*Attorney, Agent, or Firm*—Jacobson, Price, Holman & Stern, PLLC

[57] ABSTRACT

A drum for holding, moving and treating a particulate material is rotatable about its axis and has a metallic wall enclosing the axis and provided with perforation holes. A wire fabric has wires sintered to one another, rests essentially with its entire outer surface against the inner surface of the wall, is sintered essentially over its entire outer surface to the wall and separates the perforation holes thereof from the free interior space of the drum. Since the wire fabric rests essentially with its entire outer surface against the wall, no particulate material can enter between the wall and the wire fabric. The wire fabric is durable and can be cleaned rapidly and readily together with the rest of the drum.

30 Claims, 2 Drawing Sheets

DRUM FOR HOLDING A PARTICULATE MATERIAL, DEVICE HAVING A DRUM AND PROCESS FOR THE PRODUCTION OF THE DRUM

BACKGROUND OF THE INVENTION

1. Field of the Invention

The invention relates to a drum for holding and moving a particulate material which serves in particular for forming a drug.

2. Description of the Prior Art

A device disclosed in U.S. Pat. No. 4,543,906 for coating particles has a drum, rotatable about an axis, for holding and moving a particulate material. The drum has a cylindrical walled section with perforation holes. In devices known on the market and formed approximately according to the stated patents, said perforation holes have internal diameters of about 2.5 mm to 4 mm. In the production of drugs, however, it is frequently necessary to process particles whose diameters are less than 2.5 mm and, for example, about 0.2 mm to 1 mm. To ensure that such small particles do not fall out of the drum through the perforation holes, at least one textile fabric is detachably fastened by means of holders in the drum. However, during movement and treatment of fine particles, it is virtually unavoidable that particles and abraded material therefrom pass between the fabric and the wall of the drum. In the production of drugs, the purity of the products has to meet high requirements. The devices must therefore be cleaned frequently and in particular when the product is changed. The holders and the fabric must be removed from the drum, the drum, the holders and the fabric must be separately cleaned and the fabric and the holders must then be installed in the drum again. This requires a great deal of time and makes the operation of the devices more expensive. Furthermore, the textile fabrics are easily damaged during use and during removal from the drum, washing and reinsertion into the drum and must in practice be replaced after a very short time.

A device disclosed in Soviet Inventor's Certificate 1 275 065 for granulating slag has an inclined, perforated drum which is covered by a mesh. From the document cited, it is not evident what the mesh consists of and where and how the mesh is fastened. It therefore appears plausible that this granulating device has disadvantages similar to those of the devices described before, in which a textile fabric is detachably fastened by means of holders.

Japanese Patent Application Publication 59 091 865 discloses a device for the production of granular seaweed. The device has a drum with a perforated wall and a corrugated louver arranged on its inside. Said louver is formed from a net plate having holes. Since the louver is corrugated, it can rest against the wall of the drum at most at the wave summits. Cavities in which processed material, i.e. seaweed and any other material introduced for processing, can collect are therefore present between the wall and the louver. Cleaning of the drum is therefore difficult, complicated and time-consuming. Moreover, the English Abstract does not reveal the material of which the louver consists and where and how it is fastened.

SUMMARY OF THE INVENTION

It is therefore the object of the invention to provide a drum which avoids disadvantages of the known drum, can be used in particular for holding, moving and treating a material comprising fine particles and nevertheless can be cleaned easily and quickly and is durable.

This object is achieved according to the invention by a drum having an interior space for holding and moving a particulate material, an axis and a wall enclosing said axis and having perforation holes and an inner surface, the perforation holes being separated from the interior space by at least one wire fabric and the at least one wire fabric having an outer surface and an internal mesh size which is smaller than an internal diameter of the perforation holes, wherein the at least one wire fabric rests essentially over its entire outer surface against the inner surface of the wall and is fastened essentially over its entire outer surface to the wall.

The invention furthermore relates to a device having a drum, wherein the drum is mounted rotatably about the axis in a stand and wherein gas transport means are present for passing gas through the perforation holes and through the wire fabric into at least one part of the wall when the drum is rotating.

The invention furthermore relates to a process for the production of a drum having an interior space for holding and moving a particulate material, an axis and a wall enclosing said axis and having perforation holes and an inner surface, the perforation holes being separated from the interior space by at least one wire fabric and the at least one wire fabric having an outer surface and an internal mesh size which is smaller than an internal diameter of the perforation holes, wherein at least one essentially flat sheet metal piece serving to form the wall and having perforation holes and at least one essentially flat wire fabric are produced, wherein the at least one wire fabric is caused to rest, with a surface forming the outer surface of the wire fabric in the completed drum, against a surface of the sheet metal piece which subsequently forms the inner surface of the wall in the completed drum, and is fastened essentially over its entire outer surface to the sheet metal piece, wherein the sheet metal piece, together with the at least one wire fabric fastened to it, is curved and wherein edges of the sheet metal piece are one of directly and indirectly connected to one another.

The or each wire fabric arranged on the inside of the wall of the drum may be single-layer or multilayer. If the wire fabric is multilayer and has two or three or possibly even more wire fabric layers, at least two wire fabric layers may have different internal mesh sizes. The finest wire fabric layer having the smallest internal mesh size is then, for example, supported on the outside by at least one coarser supporting wire fabric layer arranged between said finest wire fabric layer and the perforated wall of the drum. The finest wire fabric layer can, for example, be protected on its inside by an even coarser protective wire fabric layer or can form the innermost wire fabric layer. If a wire fabric has two or more layers with a different internal mesh size, the finest wire fabric layer determines the internal size of the pores or openings of the entire, multilayer wire fabric. The internal mesh size of the entire wire fabric is then accordingly the same as the internal mesh size of the finest wire fabric layer having the smallest internal mesh size. According to the invention, the or each wire fabric fastened to the inside of the wall of the drum has an internal mesh size which is smaller than the internal diameter of the perforation holes and therefore also retains in the drum particles which are smaller than the internal diameter of the perforation holes. In the production of the drum, the internal mesh size can be varied within wide limits and accordingly the size of the finest particles of a particulate material to be processed can be established.

According to the invention, at least one wire fabric rests essentially with its entire outer surface against the inner surface of the wall of the drum and is fastened to the perforated wall essentially over its entire outer surface, namely sintered on the perforated wall, preferably without additional material. A remark on the meaning of the preceding term "essentially" should be included here. The or each wire fabric cannot of course rest against the wall at the perforation holes of said wall but, in the covered section of the wall, should rest essentially against all parts not occupied by perforation holes. Since in fact a wire fabric consists of wires, the outer surface of the wire fabric is not completely smooth and, in the unrolled state, not completely flat. However, the or each wire fabric should rest against the wall essentially at all wire sections defining its outer surface and not present precisely in the region of the perforation hole and should be fastened, namely preferably sintered, on said wall. In the treatment of a particulate material, virtually no material particles, no abraded material and no spray material and/or other material can then enter between the wall and the wire fabric or fabrics. The or each wire fabric can then be rapidly and thoroughly cleaned together with the remaining drum, inside the latter, for example by spraying with a cleaning liquid from the outside of the drum and/or from the inside of the drum. The metallic material of the or each wire fabric has a higher strength than the materials of the known textile fabrics. The stability and the durability of the wire fabric are additionally increased by virtue of the fact that the or each wire fabric is furthermore connected essentially over its entire outer surface directly and firmly to the inner surface of the wall of the drum, namely preferably sintered onto said drum. The or each wire fabric fastened to the wall of the drum therefore also has a long life.

The wires of the or each wire fabric are preferably sintered together at the points where they intersect and touch one another. This increases the strength of the wire fabric and prevents particles of the material from entering between intersecting wires at the intersection points and becoming jammed in there. The orifices or pores of a single-layer wire fabric or of at least the finest wire fabric layer of a multilayer wire fabric which are bounded by the meshes may have at most the same width at the inner surface of the fabric or of the fabric layer as in the middle region or may even be narrower than in said region. The wire fabric or said wire fabric layer then retains the particles of the particulate material as early as at the inner surface and not only in the middle region of the wire fabric or of said wire fabric layer. Consequently, the cleanability of the drum is further improved.

BRIEF DESCRIPTION OF THE DRAWINGS

The subject of the invention is explained below with reference to embodiments shown in the drawings. In the drawings.

DESCRIPTION OF THE PREFERRED EMBODIMENTS

Figure 1:
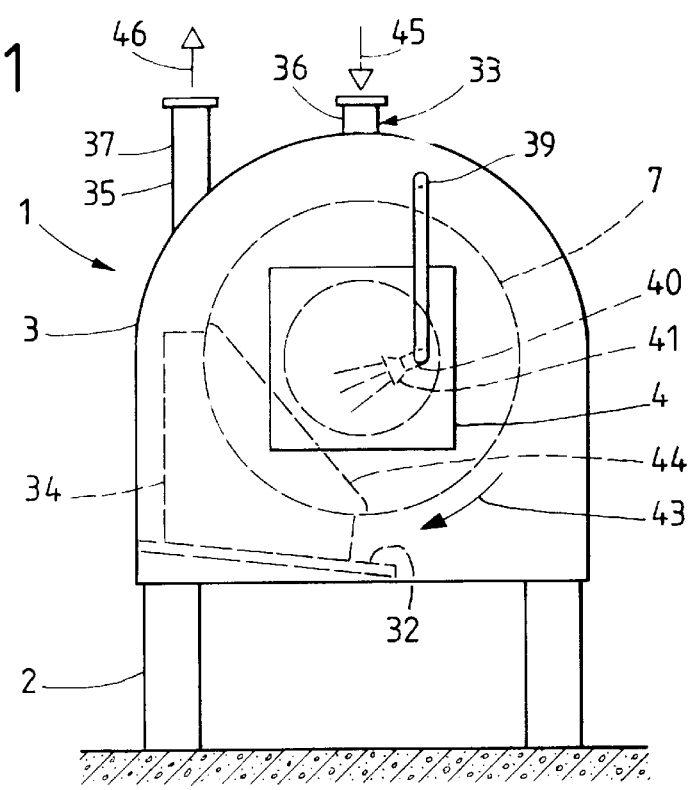
FIG. 1 shows a simplified end view of a device having a drum for moving and treating a particulate material.
Figure 2:
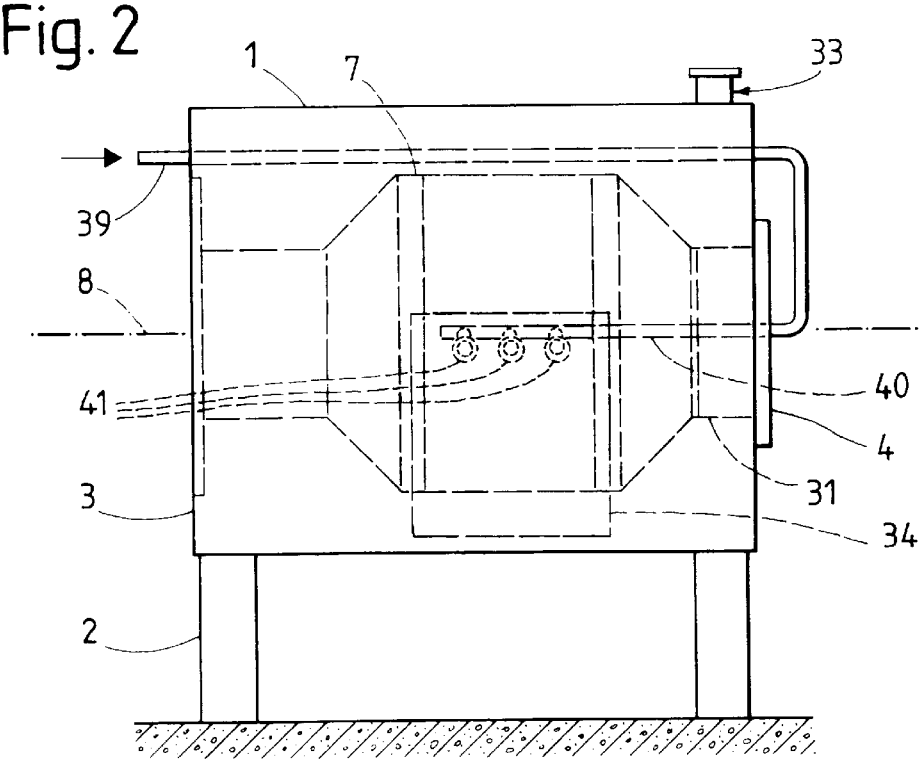
FIG. 2 shows a simplified side view of the device.

The device 1 shown in FIGS. 1 and 2 serves for moving and treating the particulate material, for example for agglomeration and pelleting and/or coating of material particles for the formation of a drug. Device 1 has a stand 2 and a housing 3 fastened to said stand. The casing of said housing has a vertical end wall with an orifice. This is closed by a closure member 4 which consists of a door having two leaves. The housing 3 also has other orifices which are closed by adjustable and/or detachably fastened closure members which are not shown. The housing 3 encloses an interior housing space which is closed all around at least dust-tight and, for example, also gas-tight from the environment.

A drum 7 is arranged in the interior housing space. The drum 7 is essentially rotationally symmetrical with respect to a horizontal axis 8 and furthermore shown separately in FIG. 3 and partly in FIG. 4. The drum 7 has a casing 10 enclosing the axis 8 and, in cross-section, an interior drum space. Said casing has a wall 11 which is generally circular in cross-section, namely essentially cylindrical, or a cylindrical shell. The cylindrical wall 11 has an inner and an outer surface and consists of a metallic, weldable material, for example stainless steel, as preferably also do the remaining parts of the casing 10. The cylindrical wall is formed from a quadrilateral, i.e. rectangular or possibly square, sheet metal piece. This originally has two straight edges which run along the axis 8, are parallel to the latter, abut one another and, in the completed drum, are connected to one another by a weld seam 12 firmly, nondetachably, tightly and in such a way that those sections of the sheet metal piece or the wall 11 which are adjacent to said edges are, at the weld seam, at least approximately smooth, continuous and stepless and come together without a joint. The middle wall section 13 of the cylindrical wall 11 is gas-permeable, namely in general perforated and provided with perforation holes 14. These are all identical. According to FIG. 4, each perforation hole 14 has a cylindrical hole section 15 opening into the inner surface of the wall 12 and a conical hole section 16 widening in a direction outward and away from said hole section 15. The perforation holes 14 are in general uniformly distributed along the axis 8 and around the latter. However, the middle, in general perforated wall section 13 of the cylindrical wall 11 has, on both sides of the weld seam 12 parallel to the axis 8, a strip-like, narrow, compact, i.e. hole-free wall section 18 running along said weld seam. The cylindrical wall 11 has two circular edges and, between said edges and the middle, perforated wall section 13, an annular, compact, i.e. hole-free, wall section 17.

The casing 10 furthermore has two conical walls 19 connected to the two ends of the cylindrical wall 11 and tapering away therefrom. Each of said walls 19 is firmly, nondetachably and tightly connected at its further end to the cylindrical wall 11 by a weld seam 20. The narrower end of the conical wall 19 present on the left in FIGS. 1 and 2 is welded to a cylindrical neck 21. The narrower end of the conical wall 19 present on the right in FIGS. 1 and 2 is connected to a neck 22 which is only very short and is formed on or welded to said wall 19. The conical walls 19 and the necks 21, 22 are compact—i.e. hole-free—and gas-tight. At its end facing away from the walls 11, 19, the neck 21 is connected, namely welded, to a generally flat, radial disk 23 projecting beyond it in the radial direction. The disk 23 closes the interior space of the drum at the end of the neck 21 tightly from the environment. Moreover, the neck 21 is also reinforced with a sleeve which encloses it over its entire length and is welded at its ends to the neck 21 and/or to the disk 23 and the conical wall 19 present closer to said disk. The other, short neck 22 is open at its free end. Moreover, this neck 22 and the conical wall 19 connected to it are also connected and reinforced from the outside with an annular disk and a short sleeve.

Figure 3:
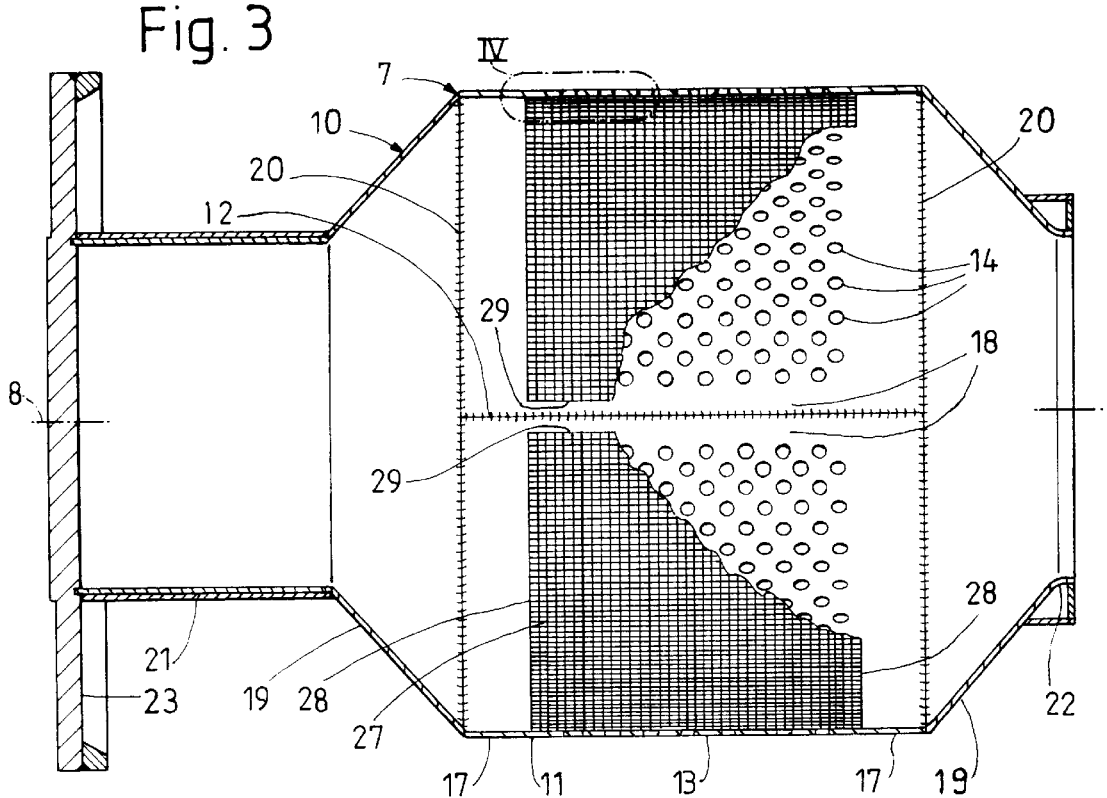
FIG. 3 shows an axial section through the drum.
Figure 4:
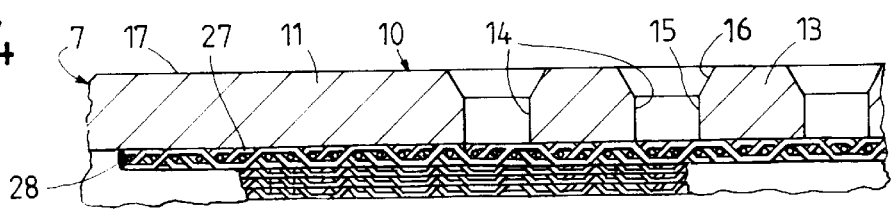
FIG. 4 shows a schematic section of the drum, which section is designated by IV in FIG. 3.

A single-layer wire fabric 27 shown in FIGS. 3 and 4 has, for example, wires which consist of stainless steel and intersect one another. Said wires are connected to one another, namely sintered together, firmly and immovably at the points of intersection. The wire fabric 27 has two edges 28 parallel to one another and two edges 29 parallel to one another. The wires of the wire fabric are welded together and fused to one another at these edges 28, 29. The wire fabric lies in a surface rotationally symmetrical with respect to the axis 8, has a shape of a cylinder which is not completely closed and approximately encloses the axis 8, possesses an inner surface and an outer surface and lies with the latter directly on the inner surface of the cylindrical wall 11. Each of the two edges 28 of the wire fabric 27 forms approximately a circle and is located at the inner surface of one of the hole-free, annular wall sections 17. Each of the two edges 29 of the wire fabric is straight and is located on the inside of one of the hole-free, strip-like wall sections 18. The edge regions of the wire fabric therefore project on all sides slightly beyond the perforation of the wall 11 so that the wire fabric covers all perforation holes 14. The wire fabric 27 lies essentially with its entire outer surface—namely with the exception of the outer surface sections located at the perforation holes 14—directly on the inner surface of the cylindrical wall 11. The wire fabric is furthermore fastened essentially on its entire outer surface directly and nondetachably to the wall 11, namely sintered firmly to the wall 11 at the points of contact of the wires of the wire fabric and the wall 11. The wires of the wire fabric were, for example, originally circular in cross-section everywhere. In the completed wire fabric fastened to the wall 11, the wires, for example, still have an approximately circular cross-section in places but are flattened at least at the sintered points. The wire fabric has openings or pores whose internal mesh size or pore size is substantially smaller than the internal diameter of the perforation holes 14, i.e. than the diameter of the cylindrical hole sections 15.

It should also be noted here that FIGS. 3 and 4 are in part not to scale. In FIG. 3, in particular the perforation holes are shown with exaggerated sizes and distances from one another in comparison with the drum dimensions. Furthermore, the wires of the wire fabric 27 in FIG. 4 are drawn with exaggerated thicknesses in comparison with the thickness of the wall 11. In addition, the wire fabric is shown in simplified form, schematically and with round wires. The maximum diameter of the drum 7, i.e. the external diameter of the cylindrical wall 11 or of the cylindrical shell, is, for example, 400 mm to 2000 mm. The thickness of the cylindrical wall 11, measured radially with respect to the axis 8, is preferably in the range from 2 mm to 5 mm and is, for example, about 3 mm to 4 mm. The internal diameter of the perforation holes 14, i.e. the diameter of the cylindrical hole sections, is preferably in the range from 2 mm to 4 mm and is, for example, approximately 2.5 mm to 3 mm. The internal mesh size or pore size of the wire fabric can be established depending on the particle sizes of the materials to be processed and is typically at most 1 mm and, for example, approximately 0.1 mm to 0.5 mm. The diameter and/or other characteristic thicknesses of the wires are preferably approximately 0.05 mm to 0.3 mm.

At the sleeve enclosing the neck 21, the drum 7 is mounted rotatably about the axis 8 by bearing means which are not shown and is connected to a drive device which is likewise not shown. A hollow cylindrical sleeve 31 shown in FIG. 2 and open at both ends is fastened coaxially with the axis 8 in the housing 3. One open end of the sleeve 31 is closed tightly by the closure member 4 when the latter is in the closed position shown in FIGS. 1 and 2. The other open end of the sleeve 31 is present in and/or at the hollow neck 22 of the drum 7, so that the interior space of the drum is connected to the interior space of the sleeve 31, the connection possibly being sealed by means of a seal.

The stand 2 is provided with guide means 32 indicated in FIG. 1. Furthermore, gas conduction and/or gas transport means 33 are present for passing and/or transporting gas—for example air—through the interior space of the drum and at least one region of the gas-permeable wall section 13 of the drum 7. The gas conduction and/or gas transport means 33 have a gas transfer box or gas transfer shoe 34 which is for instance more or less the same as the one disclosed in the already quoted U.S. Pat. No. 4,543,906. The gas transfer box or shoe is displaceably guided by the guide means 32 in such a way that it can be moved horizontally or in a slightly inclined direction toward the axis 8 and away therefrom and can be removed from the housing 3 through a closable opening of said housing. Furthermore, fixing means are present for fixing the gas transfer box 34 in various positions and in particular in the operating position shown in FIGS. 1 and 2. In the operating position, the gas transfer box 34 lies in one of the lower quadrants of the drum, at least to some extent tightly against the cylindrical wall 11 of the drum 7, and covers a region of the wall 11. That region of the wall 11 which is covered by the gas transfer box 34 extends over the entire axial extent of the gas-permeable wall section 13 and over a circumferential sector thereof. The gas transfer box 34 consists of a hollow box and bounds a chamber. The gas transfer box has, on its side adjacent to the wall 11 of the drum, an opening such that the chamber is open toward the drum. The gas transport means 33 also have two gas pipes 36 and 37. The gas pipe 36 opens into the interior space of the sleeve 31 or into that free region of the interior space of the housing which is present between the wall of the housing 3 and the drum 7 and said gas pipe 36 is thus connected to the interior space of the drum either through the sleeve 31 or through that region of the gas-permeable wall section 13 which is not covered by the gas transfer box. The gas pipe 37 is connected to the chamber of the gas transfer box 34. The gas conduction and/or gas transport means 33 furthermore have various members which are not shown and are connected to the pipes 36 and 37, namely filters, at least one pump with a fan and, for example, also at least one metering member with a flap and a heating device for heating the air supplied or the other gas supplied. Also connected is a spray device 39 having a spray member 40 which projects through the closure member 4 into the interior space of the drum and has some spray nozzles distributed along the axis 8.

In the production of the drum 7, a flat tetragonal, i.e. rectangular or possibly square, sheet metal piece which serves for forming the cylindrical wall 11 is provided, for example cut out with the required dimensions from a larger metal sheet. A wire fabric 27 is also provided, for example unrolled from a wire fabric roll and cut to the desired size. The wires of the wire fabric are pressed against one another and sintered together before or possibly after the wire fabric has been cut to size. After the wires have been sintered together and after the wire fabric 27 has been cut to size, its wires are welded to one another at the edges 28, 29 of the wire fabric 27. In particular, the projecting wire ends are fused and are welded with other wires to prevent wire pieces subsequently breaking off at the edges of the wire fabric during operation of the device and entering a material treated by means of the device. After welding of the wire fabric edges, the flat wire fabric is pressed, in a sintering oven, against the still flat sheet metal piece serving for the formation of the wall 11 and the wire fabric is firmly connected to the sheet metal piece by sintering, essentially over the entire surface facing the sheet metal piece. Thereafter, the sheet metal piece and the wire fabric fastened to it are curved together to give a cylinder and the abutting edges of the sheet metal piece are welded to one another so that the weld seam 12 is produced and the sheet metal piece forms the cylindrical wall 11. The two conical walls 19 are likewise formed by bending originally flat sheet metal pieces and by welding abutting edges of the sheet metal pieces and are then welded to the cylindrical wall 11, the weld seams 20 forming. Of the two necks 21, 22, at least the longer neck 21 is likewise formed from an originally flat sheet metal piece and welded to the remaining casing 10.

The use of the device for the batchwise treatment of a particulate material will now be explained. First, for example, the closure member 4 is temporarily opened and a batch of the particulate material to be treated is introduced into the interior space of the drum. The drum 7 is then rotated in the direction of rotation indicated in FIG. 1 by the arrow 43. The particles of the material which are present on the wall 11 of the drum are raised toward the top by the rotating drum and then slide or roll further inward to the bottom again so that a particle bed 44 comprising moving particles forms. The particle bed 44 covers a region of the gas-permeable wall section 13, this region extending over the entire opening of the gas transfer box 34. Furthermore, air is fed by the gas conduction and/or gas transport means 33 through the gas pipe 36 and sucked out through the gas pipe 37, as indicated by the arrows 45, 46 in FIG. 1. This air flows from the free region of the interior space of the drum through the particle bed 44 and through that region of the gas-permeable wall section 13 which is covered by the gas transfer box 34 into the chamber of the gas transfer box 34. Furthermore, an at least partly liquid spray material, for example consisting of a solution and/or dispersion, is sprayed from time to time onto the particles by the spray device 39. The spray material may contain, for example, a binder for agglomerating or pelleting the particles or a coating material for coating the particles. Moreover, it is possible first to agglomerate the particles to give larger particles—for example pellets—and then also to provide these with a coating. If the particles are agglomerated and/or provided with coatings, the particles can also be moved in the drum for a certain time without spraying and can be dried by means of the air passed through the particle bed. The air supplied may be heated at least from time to time. When the particles are dry, for example the closure member 4 can be opened and the particles can be removed from the drum through the opening in the housing 3, which opening is present at the closure element 4.

When the drum 7 has been emptied, said drum and the interior space of the housing can be cleaned from time to time and in particular before a change of product. For this purpose, the gas transfer box 34 can be removed from the housing 3, for example through an opening in said housing which is closed during normal operation. Furthermore, a cleaning liquid can be sprayed against the inner surfaces of the housing 3 and against the outer surfaces and inner surfaces of the casing 10 and in particular also of the wire fabric 27 of the drum by means of cleaning spray nozzles which are not shown and are installed in the housing 3 and by means of cleaning spray nozzles temporarily inserted into the interior space of the drum and/or possibly by means of the spray nozzles 41, and the cleaning liquid can be removed from the housing through an opening which is present in the base of the housing and is closed during normal operation.

Figure 5:
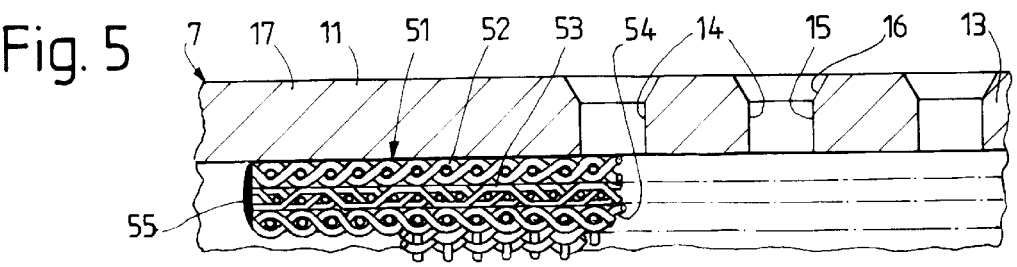
FIG. 5 shows a section, corresponding to FIG. 4, of a drum having a multilayer wire fabric.

The drum 7 shown partly in FIG. 5 has a cylindrical wall 11 whose middle wall section 13 is perforated identically or similarly to the drum described above. However, the drum according to FIG. 5 has a multilayer wire fabric 51 instead of the single-layer wire fabric 27. Said multilayer fabric has at least two wire fabric layers and namely, for example, a first wire fabric layer 52, a second wire fabric layer 53 and a third wire fabric layer 54. Each wire fabric layer 52, 53, 54 consists of wires sintered to one another. The three wire fabric layers are furthermore sintered to one another at the points of contact of the wires. The first wire fabric layer 52 rests against the inner surface of the wall 12 and consists of relatively coarse wires. The second, middle wire fabric layer 53 has finer wires and narrower pores or smaller internal mesh sizes than the first wire fabric layer. The third wire fabric layer 54 is adjacent to the free interior space of the drum and has thicker wires and wider pores or larger internal mesh sizes than the second wire fabric layer 53. The innermost wire fabric layer 52 and the outermost wire fabric layer 54 may have identical or different wire thicknesses and identical or different internal mesh sizes. The second, middle wire fabric layer 53 thus establishes the minimum size of the particles retained by the multilayer wire fabric 51. The first wire fabric layer 52 serves as a support wire fabric layer, in order to support the second, finer wire fabric layer 53 at the openings of the perforation holes 14. The third wire fabric layer 54 adjacent to the free interior space of the drum serves as a protective wire fabric layer for protecting the finer wire fabric layer 53. At least in the case of the second wire fabric layer 53 having the smallest mesh size, as in the case of the single-layer wire fabric 27, the internal mesh size may be at most 1 mm and, for example, approximately 0.1 mm to 0.5 mm or even less than 0.1 mm. The wire fabric 51 has four edges, one of which is shown in FIG. 5 and is denoted by 55. The wires of the three wire fabric layers are welded to one another at the four edges of the wire fabric. Unless stated otherwise, the drum shown partly in FIG. 5 may be formed identically or similarly to the drum described with reference to FIGS. 1 to 4.

The device can also be modified in other respects.

The wire fabric could, for example, have two wire fabric layers, one of which establishes the minimum size of the particles retained and the other has thicker wires and larger internal mesh sizes and either rests against the inner surface of the perforated wall or is adjacent to the free interior space of the drum.

In the production of the cylindrical wall 11, the wire fabric can extend right up to the abutting edges of the sheet metal piece forming the wall 11, which edges are connected to one another by the weld seam 12 in the completed drum. The wire fabric then extends along the entire circumference of the perforated wall in the completed drum.

Instead of a single wire fabric, it would be possible to provide two or more wire fabrics which are fastened to different regions of the perforated wall.

In addition, the cylindrical wall may have a removal opening which can be closed by an adjustable closure member, for example a flap held pivotably on the remaining wall, or can be opened for removal of the material contained in the drum. The closure member can be adjusted, for example, by a pneumatic adjusting device which is fastened to the drum and is formed similarly to that in U.S. Pat. No. 4,543,906 cited above. The sheet metal piece which serves for forming the cylindrical wall may then have a hole which serves for formation of the removal opening or may have an incision in at least one of its two edges subsequently welded to one another. Instead, the cylindrical wall can however also be formed from two sheet metal pieces, one of which, the larger one, extends over the largest part of the circumference and the other, the smaller, strip-like one, bounds the removal opening, at least the larger sheet metal piece then being perforated. In this case, the axial edges of the larger, perforated sheet metal piece are then, at least in part, no longer connected to one another directly via the smaller sheet metal piece, but only indirectly. Two or more wire fabrics which are fastened to different, perforated wall sections and together separate all perforation holes from the free interior space of the drum may then also be present. The closure member for closing the removal opening may be, for example, compact and free of holes. The wire fabric is then dimensioned such that it does not cover the wall in the region of the closable opening. However, it is also possible also to form the closure member as a gas-permeable, perforated wall section having perforation holes and to cover the latter on the inside of the closure member with a separate wire fabric fastened to said closure member.

The drum can furthermore be provided with paddles or other conveying members arranged in its interior and fastened to the conical walls 19, in order to move particles of the material present in the drum also in the axial direction during rotation of the drum and to improve the mixing of the material.

Furthermore, the gas-permeable wall section and the wire fabric arranged thereon may be essentially conical, at least in part, instead of being cylindrical.

Moreover, the interior space of the gas transfer box can be divided into two chambers by a wall parallel to the axis of the drum. In addition, in certain treatments, air from one of these chambers can then be passed through the gas-permeable wall section of the drum into the latter and at the same time air from the drum can be passed out of the drum through its wall into the other chamber of the gas transfer box. Furthermore, instead of air, another gas, for example nitrogen, can be passed out of the drum and/or into the drum through the gas-permeable wall section of said drum.

What is claimed is:

1. A drum having an interior space for holding and moving a particulate material and defining an axis, said drum comprising a metallic wall enclosing said axis and having perforation holes and an inner surface, the perforation holes being separated from the interior space by at least one wire fabric and the at least one wire fabric having an outer surface and an internal mesh size which is smaller than an internal diameter of the perforation holes, wherein the at least one wire fabric rests essentially over its entire outer surface against the inner surface of the wall and is fastened essentially over its entire outer surface to the wall by sintering thereon.

2. The drum as claimed in claim 1, wherein the at least one wire fabric has wires sintered to one another at intersection points of said wires.

3. The drum as claimed in claim 1, wherein the at least one wire fabric has edges and wires which are welded to one another at the edges.

4. The drum as claimed in claim 1, wherein the at least one wire fabric is a single-layer wire fabric.

5. The drum as claimed in claim 4, wherein the at least one wire fabric has an internal mesh size of at most 1 mm.

6. The drum as claimed in claim 1, wherein the at least one wire fabric has at least two wire fabric layers lying one on top of the other and having different internal mesh sizes.

7. The drum as claimed in claim 6, wherein at least one wire fabric layer has an internal mesh size of at most 1 mm.

8. The drum as claimed in claim 6, wherein the at least one wire fabric has three wire fabric layers lying one on top of the other.

9. The drum as claimed in claim 6, wherein the wire fabric layers lying on one another are sintered to one another.

10. The drum as claimed in claim 6, wherein at least one of the wire fabric layers has an internal mesh size of at most 0.5 mm.

11. A device having a drum as claimed in claim 1, wherein the drum is mounted rotatably about the axis in a stand and wherein gas conduction means are present for passing gas through the perforation holes and through the wire fabric into at least one part of the wall when the drum is rotating.

12. The device as claimed in claim 11, wherein the gas conduction means have a gas transfer box and means for holding said box on the stand when the drum is rotating, in such a way that said box rests against a region of the outer surface of the wall for passing gas through the perforation holes of the wall and through the at least one wire fabric.

13. The drum as claimed in claim 1, wherein the wall and the at least one wire fabric comprise stainless steel.

14. The drum as claimed in claim 1, wherein the at least one wire fabric is fastened to the wall exclusively by sintering thereon without additional fastening material.

15. The drum as claimed in claim 1, wherein the perforation holes have internal diameters in the range from 2 mm to 4 mm and wherein the internal mesh size of the at least one wire fabric is at most 0.5 mm.

16. The drum as claimed in claim 1, wherein the perforation holes have a cylindrical hole section opening into the inner surface of the wall and a conical hole section widening in a direction outward and away from said cylindrical hole section.

17. The drum as claimed in claim 1, wherein the perforation holes are arranged in a wall section which is one of cylindrical and conical, wherein the wire fabric forms accordingly at least a part of one of a cylinder and of a cone and wherein the wire fabric is free of corrugations.

18. A process for the production of a drum having an interior space for holding and moving a particulate material, said drum defining an axis and including a metallic wall enclosing said axis and having perforation holes and an inner surface, the perforation holes being separated from the interior space by at least one wire fabric and the at least one wire fabric having an outer surface and an internal mesh size which is smaller than an internal diameter of the perforation holes, the process comprising producing at least one essentially flat sheet metal piece serving to form the wall and having perforation holes and producing at least one essentially flat wire fabric with a surface forming the outer surface of the wire fabric in the completed drum, causing said wire fabric to rest against a surface of the sheet metal piece which subsequently forms the inner surface of the wall in the completed drum, fastening said wire fabric essentially over its entire outer surface to the sheet metal piece by sintering on said sheet metal piece, curving said sheet metal piece, together with the at least one wire fabric fastened to it, such that the edges of the sheet metal piece are one of directly and indirectly connected to one another.

19. The process as claimed in claim 18, wherein the perforation holes have internal diameters in the range from 2 mm to 4 mm.

20. The process as claimed in claim 18, wherein the at least one wire fabric has at least two wire fabric layers lying one on top of the other, having different internal mesh sizes and being sintered to one another and wherein at least one of the wire fabric layers has an internal mesh size of at most 1 mm.

21. The process as claimed in claim 20, wherein at least one of the wire fabric layers lying one on top of the other has an internal mesh size of at most 0.5 mm.

22. The process as claimed in claim 18, wherein the at least one wire fabric is fastened to the wall exclusively by sintering thereon without additional fastening material.

23. The process as claimed in claim 18, wherein the at least one wire fabric is free of corrugations.

24. The process as claimed in claim 18, wherein the wall and the at least one wire fabric are made from stainless steel.

25. A drum having an interior space for holding and moving a particulate material and defining an axis, said drum comprising a wall enclosing said axis and having perforation holes and an inner surface, the perforation holes being separated from the interior space by at least one wire fabric and the at least one wire fabric having an outer surface and an internal mesh size which is smaller than an internal diameter of the perforation holes, wherein the at least one wire fabric rests essentially over its entire outer surface against the inner surface of the wall and is fastened essentially over its entire outer surface to the wall by sintering thereon, wherein the wall and the at least one wire fabric comprise stainless steel, wherein the at least one wire fabric has at least two wire fabric layers lying one on top of the other and having different internal mesh sizes, and wherein the wires of each wire fabric layer as well as of the different wire fabric layers lying one on top of the other are sintered to one another at intersection points of the wires, and wherein one of the wire fabric layers has an internal mesh size of at most 1 mm.

26. The drum as claimed in claim 25, wherein the at least one wire fabric has three wire fabric layers lying one on top of the other.

27. The drum as claimed in claim 25, wherein at least one of the wire fabric layers has an internal mesh size of at most 0.5 mm.

28. The drum as claimed in claim 25, wherein the at least one wire fabric is fastened exclusively to the wall by sintering thereon without additional fastening material.

29. The drum as claimed in claim 25, wherein the perforation holes have internal diameters in the range from 2 mm to 4 mm.

30. The drum as claimed in claim 25, wherein the perforation holes are arranged in a wall section which is one of cylindrical and conical, wherein the wire fabric forms accordingly at least a part of one of a cylinder and of a cone and wherein the wire fabric is free of corrugations.

* * * * *